United States Patent
Adl-Tabatabai et al.

(10) Patent No.: US 9,383,979 B2
(45) Date of Patent: Jul. 5, 2016

(54) OPTIMIZING INTERMEDIATE REPRESENTATION OF SCRIPT CODE BY ELIMINATING REDUNDANT REFERENCE COUNT OPERATIONS

(71) Applicant: Facebook, Inc., Menlo Park, CA (US)

(72) Inventors: Ali-Reza Adl-Tabatabai, San Jose, CA (US); Guilherme de Lima Ottoni, Campbell, CA (US); Michael Paleczny, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 44 days.

(21) Appl. No.: 14/614,263

(22) Filed: Feb. 4, 2015

(65) Prior Publication Data

US 2015/0154010 A1    Jun. 4, 2015

Related U.S. Application Data

(63) Continuation of application No. 13/865,932, filed on Apr. 18, 2013, now Pat. No. 8,990,789.

(51) Int. Cl.
*G06F 9/45* (2006.01)
*G06F 12/02* (2006.01)

(52) U.S. Cl.
CPC .............. *G06F 8/443* (2013.01); *G06F 8/4435* (2013.01); *G06F 8/52* (2013.01); *G06F 12/0261* (2013.01)

(58) Field of Classification Search
CPC ........ G06F 12/0261; G06F 8/52; G06F 8/443
USPC .................................. 717/146, 152; 708/814
See application file for complete search history.

(56) References Cited

U.S. PATENT DOCUMENTS

| 4,716,524 | A | 12/1987 | Oxley et al. |
| 4,996,663 | A | 2/1991 | Nemes |
| 5,121,495 | A | 6/1992 | Nemes |
| 6,230,312 | B1 | 5/2001 | Hunt |
| 6,292,792 | B1 * | 9/2001 | Baffes .................... G06N 5/022 706/45 |
| 6,473,773 | B1 * | 10/2002 | Cheng ................... G06F 9/4428 707/814 |
| 6,499,137 | B1 | 12/2002 | Hunt |
| 7,203,933 | B2 | 4/2007 | Souloglou et al. |
| 7,203,934 | B2 | 4/2007 | Souloglou et al. |

(Continued)

OTHER PUBLICATIONS

Non-Final Office Action Mailed Apr. 28, 2015 of Co-Pending U.S. Appl. No. 14/543,615 of de Lima Ottoni, G., et al., filed Nov. 17, 2014.

(Continued)

*Primary Examiner* — Phillip H Nguyen
(74) *Attorney, Agent, or Firm* — Perkins Coie LLP

(57) ABSTRACT

Disclosed here are methods, systems, paradigms and structures for optimizing generation of intermediate representation (IR) for a script code by eliminating redundant object reference count operations from the IR. An IR of the script includes (a) a set of first code that increments a reference count of an object when a programming construct refers to the object, and (b) an associated set of second code which decrements the reference count of the object when a reference to the object is removed. The IR is analyzed to identify a subset of the set of second code which, upon execution, does not decrement the reference count of the object to a zero value. The subset of second code and the first code corresponding to the subset is removed from the IR to generate an optimized IR. The optimized IR is further converted to an executable code.

20 Claims, 14 Drawing Sheets

(56) References Cited

U.S. PATENT DOCUMENTS

| 7,565,386 | B2 | 7/2009 | Joisha |
| 7,580,997 | B2 | 8/2009 | Sterling et al. |
| 7,693,919 | B2 | 4/2010 | Joisha |
| 8,990,789 | B2 | 3/2015 | De Lima et al. |
| 9,152,400 | B2 | 10/2015 | de Lima Ottoni et al. |
| 2004/0128660 | A1 | 7/2004 | Nair et al. |
| 2005/0273772 | A1 | 12/2005 | Matsakis et al. |
| 2007/0198617 | A1* | 8/2007 | Joisha ............ G06F 12/0261 |
| 2007/0226281 | A1* | 9/2007 | Joisha ............ G06F 12/0261 |
| 2014/0317607 | A1 | 10/2014 | Adi-Tabatabai et al. |
| 2015/0074655 | A1 | 3/2015 | Simmers et al. |

OTHER PUBLICATIONS

Notice of Allowance Mailed Aug. 7, 2015 in Co-Pending U.S. Appl. No. 14/543,615 of de Lima Ottoni, G., et al., filed Nov. 17, 2014.

Tzi-cker Chiueh, "An Architectural Technique for Cache-level Garbage Collection", 1991.

Armstrong et al., "Compiler Optimization for distributed dynamic data flow programs," UChigaco, Argonne, LLC, Argonne National Laboratory, U.S. Dept. of Energy Office of Science, 10 pages, 2013.

Joisha, P.G. et al., "Compiler Optimizations for Nondeferred Reference-Counting Garbage Collection," ISMM '06, pp. 150-151, Jun. 10-11, 2006.

Non-Final Office Action Mailed Sep. 17, 2014 in U.S. Appl. No. 13/865,932 of Adi-Tabatabai, A.-R. et al., filed Apr. 18, 2013.

Notice of Allowance Mailed Dec. 22, 2014, in U.S. Appl. No. 13/865,932 of Adi-Tabatabai, A.-R. et al., filed Apr. 18, 2013.

U.S. Appl. No. 13/365,932 of Adl-Tabatabai, A.-R., et al. filed Apr. 18, 2013.

U.S. Appl. No. 14/543,615 of de Lima Ottoni, G. et al. filed Nov. 17, 2014.

\* cited by examiner

US 9,383,979 B2

OPTIMIZING INTERMEDIATE REPRESENTATION OF SCRIPT CODE BY ELIMINATING REDUNDANT REFERENCE COUNT OPERATIONS

CROSS-REFERENCE TO RELATED APPLICATION

This application is a continuation of U.S. patent application Ser. No. 13/865,932, filed on Apr. 18, 2013, entitled "OPTIMIZING INTERMEDIATE REPRESENTATION OF SCRIPT CODE BY ELIMINATING REDUNDANT REFERENCE COUNT OPERATIONS", which is incorporated herein by reference in its entirety.

FIELD OF INVENTION

This invention relates to compilation of script code in general and more specifically to optimizing an intermediate representation (IR) of the script code by eliminating redundant reference count operations from the IR.

BACKGROUND

Scripting languages offer simplicity and ease of development to software developers. Script code is easy to write since scripting languages are often based on a small set of expressions and statements that are simple to learn. Software developers often use scripting languages for rapid development of applications, for example, web applications. Scripting languages may be used for server side programs or for client side programs. Examples of server side scripting languages include PHP (Personal Home Page) and examples of client side scripting languages include JAVASCRIPT.

Server side script code can be used for executing a user request received at a web server by dynamically generating web pages. Server side scripting is often used for implementation of interactive websites that interface with data stores for retrieving and storing information. The PHP scripting language allows embedding of script code with hypertext markup language (HTML). Client side script code is often used for performing simple computations on the client side rather than sending a request to the server for simple computations.

Conventional approaches to execute script code include executing the script code using an interpreter. However, an interpreter may not be able to perform several optimizations that a compiler that generates executable code can perform. Therefore, interpreting script code can be inefficient compared to running executable code obtained by compiling the script code. Most compilers translate the source program first to some form of intermediate representation (IR) and convert from there into machine code. The IR is independent of the machine for which the IR is generated, and independent of the source code language it is generated from.

There are many IRs in use but these various representations do not provide efficient means for tracking references an object allocated in the memory. When an object is created and allocated space in the memory, many variables can refer to the same object, that is, the object may have various pointers pointing to the object. The current IRs do not provide an efficient way to track the number of references to the object. The operations for tracking the references, such as incrementing a count when a new pointer is pointing to the object and decrementing a count when the pointer is removed, are built into or inherent to the operations that create, delete, assign objects. The current IRs do not provide an opportunity to optimize the reference count operations. Accordingly, an executable code generated from the IR includes significant amount of code for tracking the references, which consumes significant computing resources.

SUMMARY

Introduced here are methods, systems, paradigms and structures for optimizing an intermediate representation (IR) generated for a script code by eliminating redundant reference count operations from the IR. An IR generated for the script code includes (a) a set of first code that increments a reference count of an object when a programming construct refers to the object, and (b) an associated set of second code which decrements the reference count of the object when a reference to the object is removed. The IR is analyzed to identify a subset of the set of second code which, upon execution, does not decrement the reference count of the object to a zero value. The subset of second code, and the first code corresponding to the subset is removed from the IR to generate an optimized IR. The optimized IR is further converted to an executable code.

Some embodiments of the disclosed technique have other aspects, elements, features, and steps in addition to or in place of what is described above. These potential additions and replacements are described throughout the rest of the specification.

DETAILED DESCRIPTION

Figure 1:
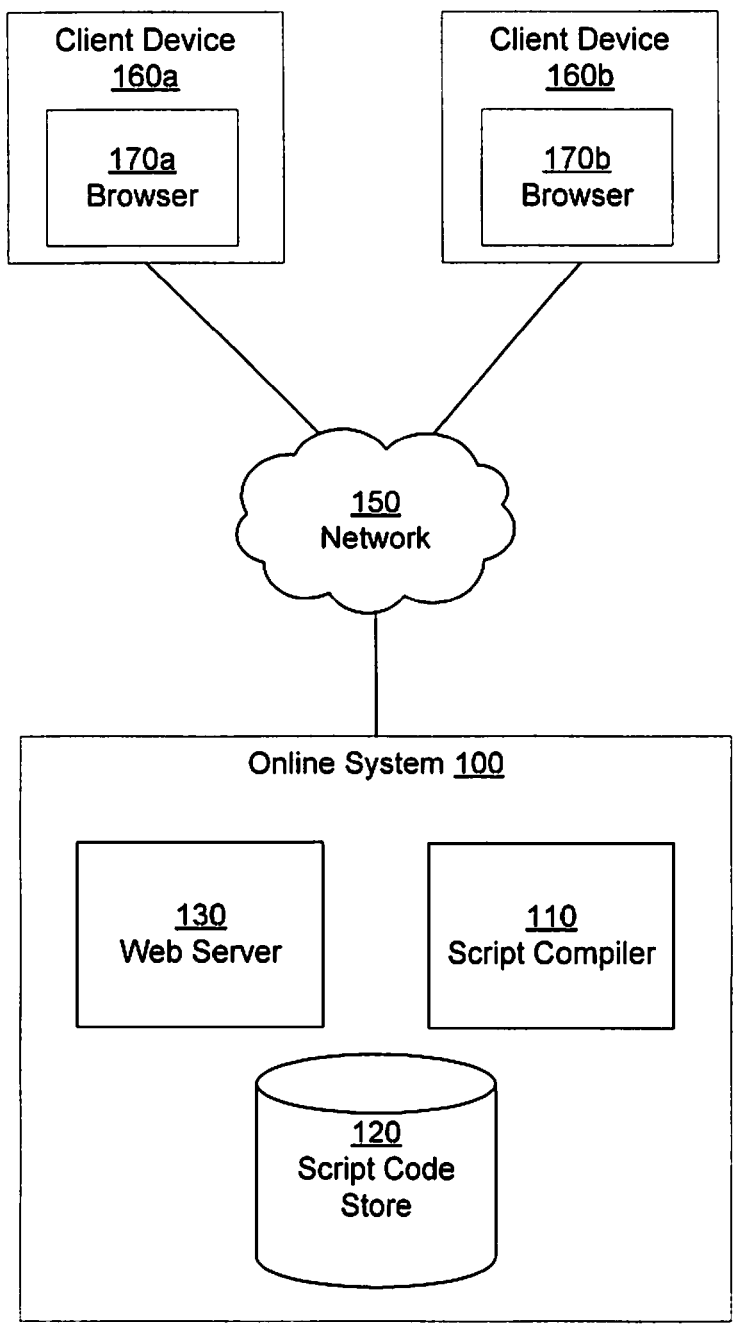
FIG. 1 is an environment in which an embodiment of the disclosed technique may operate.

References in this description to "an embodiment", "one embodiment", or the like, mean that the particular feature, function, or characteristic being described is included in at least one embodiment of the present invention. Occurrences of such phrases in this specification do not necessarily all refer to the same embodiment, nor are they necessarily mutually exclusive.

A compiler can translate a source program first to some form of intermediate representation (IR) and then convert the IR into machine code/executable code. In an embodiment, the IR is a machine-and-language independent version of the source code. Use of an IR provides advantages in increased abstraction, cleaner separation between the front and back ends, and adds possibilities for cross-compilation among various type of systems and/or languages. IR also lend themselves to supporting advanced compiler optimizations. Further, different compilers can generate different types of IR.

Disclosed here are methods, systems, paradigms and structures for optimizing an IR of the script code by eliminating redundant reference count operations from the IR. An IR generated for the script code includes operations for tracking a reference count of an object. The generated IR includes (a) code that increments a reference count of an object (referred to as "incref") when a programming construct such as a variable refers to the object, and (b) an associated second code which decrements the reference count of the object (referred to as "decref") when a reference to the object is removed. The IR is analyzed to identify decref code which, upon execution, does not decrement the reference count of the object to a zero value. The decref code that does not decrement the reference count to zero is referred to as "decref Non-Zero" (decrefNZ). The decrefNZ code and the corresponding incref code pair is marked as redundant code, and is removed from the IR to generate an optimized IR. The optimized IR is further converted to an executable code for execution of the script code.

The IR for the script code could be in various formats that are in between the original source code and an executable code generated for a particular machine. The various formats can include a byte code, a low level language code, or any other human understandable format. An IR generation module generates the IR of the script code. The IR includes code for tracking references to an object. In certain programming languages, a user-defined code, such as a destructor, is executed to perform certain other operations when the object is not being referred to anymore and the memory allocated to the object is reclaimed. In an embodiment, the decref code can trigger the execution of the destructor when the reference count of the object goes down to zero. The IR can be analyzed to find decref code that does not decrement the reference count to zero and eliminate the identified incref-decref code pair from the IR. The resulting IR will have less instructions to execute, and the generated executable code therefore, consumes lesser computing resources to execute, thereby enhancing the execution performance of the script code.

The script code can be written in various programming languages, including PHP (Personal Home Page), and can be executed in either a single-threaded environment or multi-threaded environment. The embodiments of the disclosed technique are described with reference to FIGS. 6-11. Further, the above described embodiments may be performed in various environments, including the environment described in association with FIGS. 1-5.

FIG. 1 shows a system environment for allowing a client device to interact with an online system that generates dynamic web pages by compiling script code, in accordance with an embodiment of the disclosed technique. FIG. 1 illustrates client devices 160 interacting with an online system 100 using the network 150. The client devices 160 send requests to the online system 100 via the network 150. The online system 100 may dynamically generate web pages in response to the request and send the generated web pages to the client device 160 in response to the request.

FIG. 1 and the other figures use like reference numerals to identify like elements. A letter after a reference numeral, such as "160a," indicates that the text refers specifically to the element having that particular reference numeral. A reference numeral in the text without a following letter, such as "160," refers to any or all of the elements in the figures bearing that reference numeral (e.g., "160" in the text refers to reference numerals "160a" and/or "160b" in the figures).

Embodiments of the computing environment can have multiple client devices 160 and multiple online systems 100 connected to the network 150. Certain functionality described in one embodiment as being performed on the server side can also be performed on the client side in other embodiments if appropriate. For example, although FIG. 1 shows the script compiler 110 running on the online system 100 for compiling server side script code, in other embodiments, the script compiler 110 may run on the client device 160 for compiling client side script code. In addition, the functionality attributed to a particular component can be performed by different or multiple components operating together.

The client devices 160 include one or more computing devices that can receive user input and can transmit and receive data via the network 150. The client device 160 can execute an application, for example, a browser application 170 that allows a user of the client device 160 to interact with the online system 100. A user may provide input using a user interface presented to the user via the browser application 170. The interactions of the user via the browser application 170 may cause the browser application 170 to send a request for information that identifies a markup language document including server side scripting code. The markup language document is processed to obtain a transformed markup language document that is returned in response to the request.

The network 150 uses standard communications technologies and/or protocols. Thus, the network 150 can include links using technologies such as Ethernet, 802.11, worldwide interoperability for microwave access (WiMAX), 3G, digital subscriber line (DSL), etc. Similarly, the networking protocols used on the network 150 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 170 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), Internet Protocol security (IPsec), etc.

The online system 100 comprises a web server 130, a script compiler 110 and a script code store 120. The web server 130 is a module processing requests received by the online system 100 from client devices 160 or other external systems that interact with the online system 100. The web server 110 may be implemented by conventional web server software, such as APACHE or INTERNET INFORMATION SERVICES. In response to a request from a client device 160, the web server 130 may invoke other modules of the online system 100 to process the request. For example, the web server 130 may invoke modules of the online system 100 to obtain a web page in response to the request from the client device 160. The web server 130 sends the web page to the client device 160 for presentation on the browser 170.

The script code store 120 stores script code that implements portions of functionality provided by the online system 100 to client devices 160. A script code may include a function, procedure, method, or a block of code that may be embedded within an HTML document. The script code implements functionality, for example, retrieving information stored in various databases of the online system 100, performing computations, or interacting with other systems.

The script compiler 110 takes script code in source code form and generates equivalent executable code for execution by a processor of the online system 100 (in this disclosure, the term "script code" is also referred to as "script.") In an embodiment, the script compiler 110 performs incremental compilation of the script code in a lazy fashion. For example, a portion of script code is compiled if a request causes this portion of script code to execute. Once a portion of the script code is compiled, the generated executable code is available for future requests. However, if no request received by the online system 100 needs to execute a particular portion of the script code, that particular portion may not be compiled. Therefore, no executable code corresponding to a particular portion of script may exist in the online system 100 if no request from a client device needs to execute that portion of script. For example, a script may include an "if-then-else" statement that executes an "if" portion of script if a condition evaluates to true and an "else" portion of script if the condition evaluates to false. If all incoming requests evaluate the condition to a true value, these request only execute the "if" part of the script. Accordingly, executable code corresponding to the "else" part of the "if-then else" statement may never be generated, unless an incoming request results in the condition being evaluated to a false value.

Figure 2:
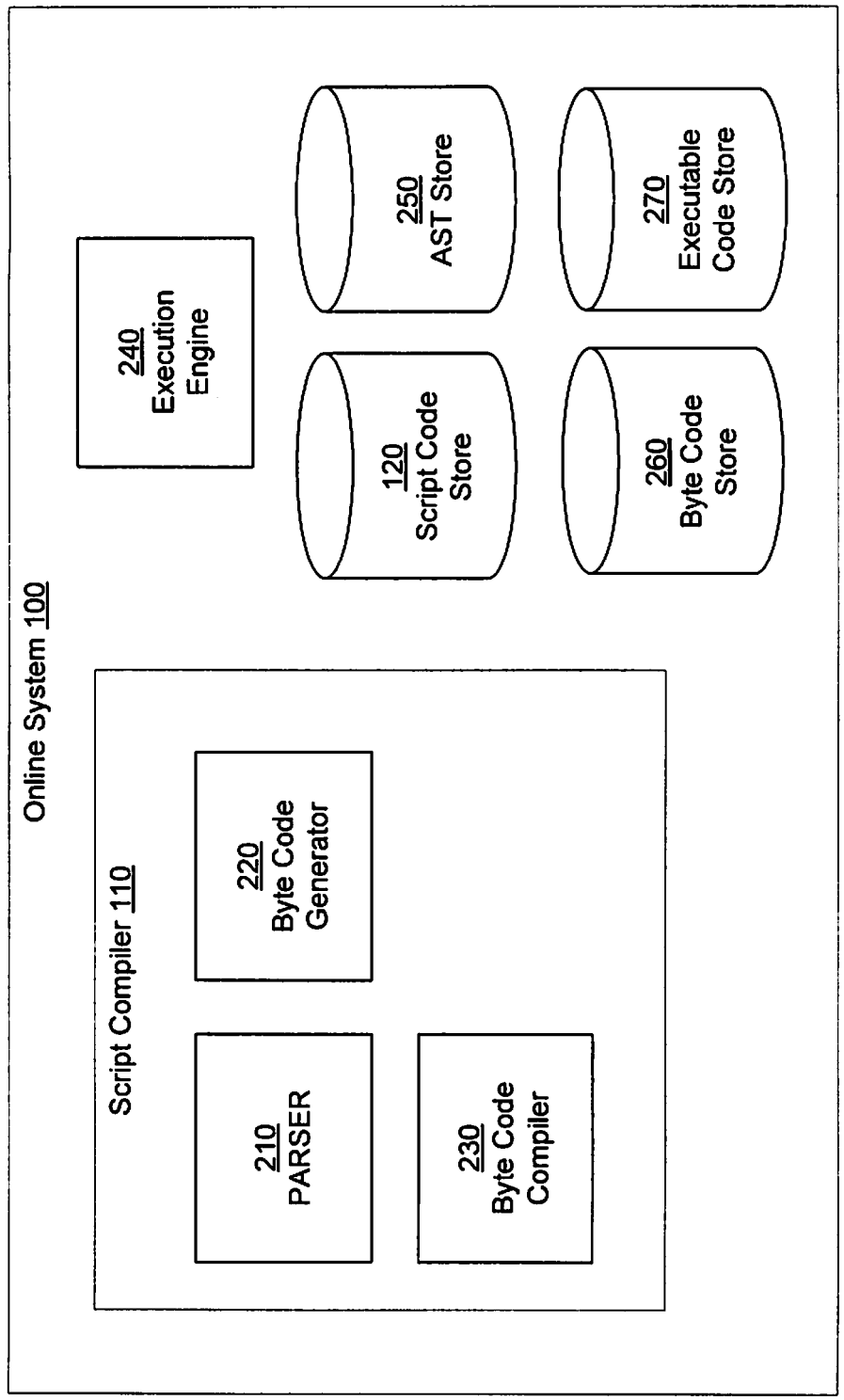
FIG. 2 is a block diagram illustrating an architecture of an online system that generates dynamic web pages by incrementally compiling script code at runtime.

FIG. 2 illustrates an architecture of an online system 100 that generates dynamic web pages by incrementally compiling script code at runtime, in accordance with an embodiment of the disclosed technique. The online system includes the script code store 120, an abstract syntax tree (AST) store 250, a byte code store 260, an executable code store 270, an execution engine 240, and the script compiler 110. The script compiler 110 further includes a parser 210, a byte code generator 220, and a byte code compiler 230. Some embodiments of the online system 100 have different and/or other modules than the ones described herein, and the functions can be distributed among the modules in a different manner than is described here. For example, several modules shown in the online system 100 may be present in a client device 160 if the script code being processed is client side script code.

The script code store 120 stores script code, for example, script code specified as PHP, server side JAVASCRIPT, or another syntax. The script code may be input by a software developer using an editor or copied from another computer. In an embodiment, the script code is specified in a human readable text form. The parser 210 reads the script code from one or more files in the script code store 120 and builds a data structure called an AST that is stored in the AST store 250. The AST is a hierarchical tree representation of script code. The parser 125 checks the script code for syntax errors and reports the errors to allow a user to correct the errors.

The byte code generator 220 traverses the AST representation of the script code and generates byte code corresponding to the script code. The byte code is stored in the byte code store 260. The byte code includes code represented using an instruction set that is designed for efficient execution by an interpreter or for efficient compilation into executable code, for example, machine code. The byte code instructions may correspond to a virtual stack machine or a virtual register machine. The byte code compiler 230 converts byte code into executable code and stores the generated executable code in the executable code store 270.

The execution engine 240 executes the instructions available in the executable store 270. For example, the execution engine 240 may be invoked in response to a request received from a client device 160. The execution engine 240 identifies executable code corresponding to the request received for execution. An online system 100 may compile all available byte code stored in the byte code store 260, for example, as a batch process and store the generated executable code in the executable code store 270. Compiling all available byte code store in advance ensures that executable code is readily available for any request that is received by the online system, so long as the corresponding script code is available in the script code store 120. However, script code typically supports features that make it difficult to generate efficient executable code. For example, script code may support untyped variable for which the type is not available until runtime. Programmers often use untyped variables since they do not require the programmer to make early decisions regarding types of variables used. A programmer may specify a variable as untyped even if at runtime the variable only stores values of one particular type, for example, an integer value. In practice significant amount of script code is executed based on a limited set of types corresponding to the untyped variables. However, if the online system 100 compiles the byte code to executable code prior to receiving the requests at runtime, the type information may not be available for the variables. A byte code compiler 230 that compiles the byte code without making any specific assumptions about the types of the variables may generate inefficient executable code since the generated executable code accounts for all possible types that each untyped variable may take, whether or not the incoming requests use these types.

Embodiments of the byte code compiler 230 compile byte code to executable code based on information available at runtime. For example, the byte code compiler 230 may utilize type information of variables obtained during an execution of the script code to generate executable code optimized for these specific types. Accordingly, executable code required for executing a request may or may not be available in the executable code store 270 at runtime. If executable code corresponding to the request is not available in the executable code store 270, the execution engine 240 identifies byte code corresponding to the request from the byte code store 230. The execution engine 240 invokes the byte code compiler 230 to compile the byte code corresponding to the request to generate executable code. The execution engine 240 provides type information of variables obtained during the current execution of the script code to the byte code compiler 230. Accordingly, the byte code compiler 230 generates efficient executable code based on the type information of variables available. The execution engine 240 executes the generated executable code. In some embodiments, executable code may be generated directly from script code without requiring byte code generation.

If future executions of the script code provide variables of the same type as the first request, the executable code can be reused for the future requests. However, if a subsequent execution provides a different combination of types of variables compared to the first execution, the execution engine 240 invokes the byte code compiler 230 to generate executable code corresponding to the new combination of types corresponding to the variables. Accordingly, the executable code store 270 may store different executable codes for the same byte code program, each executable code corresponding to a different combination of variable types. The byte code compiler 230 may never generate executable code corresponding to type combinations that are never received in executions of the script code.

In an embodiment, the byte code compiler 230 compiles a basic block of byte code at a time. A basic block of code has one entry point, i.e., no instruction within the basic block other than the entry point can be reached from anywhere in the script code as a destination of a jump instruction. The entry point is typically the first instruction of the basic block. A basic block may have one or more exit point, i.e., typically the last instruction of the basic block causes the program control to start executing another basic block. The last instruction may evaluate certain condition and determine the next basic block for execution based on the result of the evaluation of the condition. For example, the last instruction may evaluate a binary condition and transfer program control to one basic block if the condition evaluates to true otherwise transfer program control to another basic block (if condition evaluates to false). Similarly, the last instruction of the basic block may transfer control to different basic blocks based on the value of a particular variable. For example, if the variable value is 1, program control is transferred to basic block B1, if the variable value is 2, program control is transferred to basic block B2, if the variable value is 3, program control is transferred to basic block B3, and so on. The simple structure of a basic block makes it easy for the byte code compiler 230 to optimize and compile a basic block.

The executable code of the script includes executable blocks (also referred as "executable basic blocks") of the script and/or executable control regions of the script. An executable block corresponds to a basic block of the script (which is described in further detail with reference to FIGS. 4 and 5), whereas an executable control region of the script includes instructions for executing a set of basic blocks. An executable control generator 235 generates an executable control region for a set of basic blocks based on various criteria (which is described in further detail with reference to FIGS. 6-10).

Figure 3:
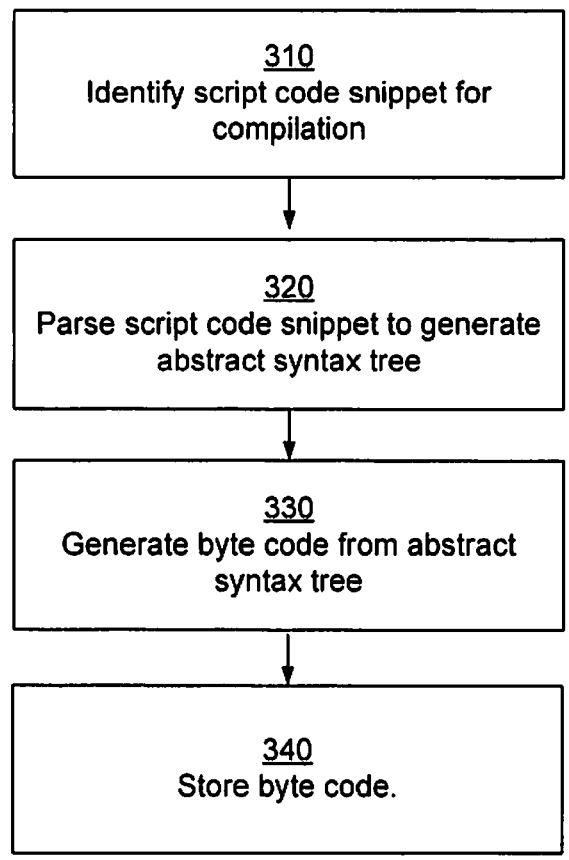
FIG. 3 is a flow diagram illustrating the process of compiling script code.

FIG. 3 is a flow diagram illustrating the process of compiling script code, in accordance with one embodiment of the disclosed technique. The process illustrated in FIG. 3 may be executed by the script compiler 110 as a batch process that compiles script code stored in the script code store 120. For example, software developers may periodically provide new scripts implementing certain features of the online system 100. The received script code may be compiled as a batch process by the online system 100. Alternatively, software developers may update existing script code, thereby requiring recompilation of the updated script code. The script compiler 110 may repeat the steps shown in FIG. 3 for all the script code that need to be recompiled.

The script compiler 110 identifies 310 a script for compilation. The script compiler 110 invokes the parser 210 for parsing the script. The parser 210 parses 320 the script code to generate an AST representation of the script code. The parser 210 stores the AST representation in the AST store 250. In an embodiment, modules of the script compiler 110 perform various operations using the AST representation, for example, static analysis, type inference, and optimizations. As a result, the script compiler 110 may annotate the AST and/or transform the AST. The script compiler 110 stores the annotated ASTs or the transformed ASTs in the AST store 250. Each step performed by the script compiler 110 typically use the latest version of the AST from the AST store 250 and generates a subsequent version of the AST. The byte code compiler 230 generates 330 byte code from the AST representation of the script code and stores 340 the generated byte code in the byte code store 260.

The byte code compiler 230 incrementally compiles the byte code stored in the byte code store at runtime to generate corresponding executable code. The byte code compiler 230 performs the incremental compilation responsive to executions of the script code, for example, executions caused by requests received from client devices 160.

In at least some embodiments, the execution engine 240 requests compilation of one basic block of byte code at a time. More specifically, the execution engine 240 requests compilation of one basic block for a particular combination of types of the variables as required for execution of an incoming request. In at least some other embodiments, the execution engine 240 may request compilation of a group of basic blocks to generate more optimal executable code. Additionally or alternatively, the execution engine 240 may request the compilation of one basic block during a first phase of execution of the script, and request compilation of group of basic blocks during a second phase of execution.

Figure 4:
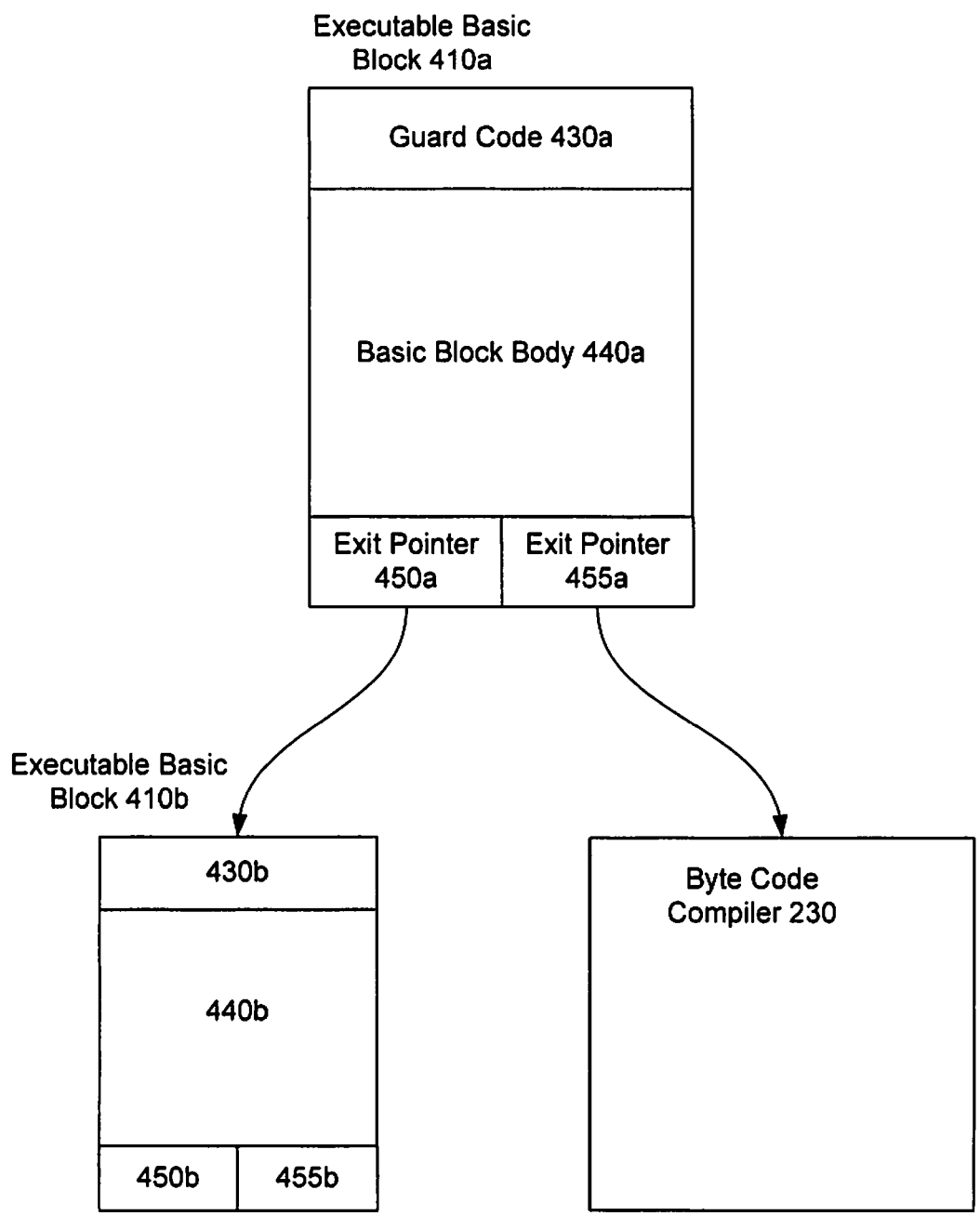
FIG. 4 illustrates the structure of executable code generated by a script compiler.

FIG. 4 is a diagram illustrating the structure of executable code generated by a script compiler, in accordance with one embodiment of the disclosed technique. The generated executable basic block 410 includes a portion of guard code 430, a basic block body 440, and one or more exit pointers 450. The executable basic block 410 is generated in response to receiving a request from the client device 160. Accordingly, the executable basic block 410 is optimized for the types of variables as provided by the incoming request.

The following example illustrates how executable code is generated for a given basic block. Assume that a basic block includes two untyped variables varA and varB. Further assume that for a particular execution it is determined that both variables varA and varB are integers. Accordingly, the byte code compiler 230 compiles the basic block to generate the basic block body 440 assuming the variables varA and varB are integers. The guard code 430 includes instructions that check a particular condition before executing the basic block body 440. In the above example, the generated guard code 430 verifies that the types of variables varA and varB are integers. If the types of both variables are integers, the guard code 430 continues execution of the basic block body 440.

The last instruction of an executable basic block 410a that is executed typically causes the program control to begin execution of another executable basic block 410b. Accordingly, the last instruction of the executable basic block 410 may include an exit pointer 450 that specifies the address of an executable basic block 410b for execution after the execution of the executable basic block 410. The last instruction of an executable basic block 410a that is executed may transfer control to different executable basic blocks 410 depending on certain criteria. For example, the last instruction in a basic block may correspond to an "if" condition that executes one basic block if the condition is evaluated to true and another basic block if the condition is evaluated to false. Therefore, the last instruction of the executable basic block 410 may include one or more exit pointers 450a, 455a, and so on.

The exit pointer 450a points to another executable basic block 410b. If a particular executable block that needs to be executed subsequent to the execution of the executable basic block 410a has not been compiled so as to generate a corresponding executable basic block, the corresponding exit pointer 455a transfers control to the byte code compiler 230. The byte code compiler 420 may be provided with information describing the subsequent basic block that needs to be compiled. The address of the subsequent basic block may be communicated to the byte code compiler 230 using function-calling conventions of the native machine in which the system is hosted. In this embodiment, the byte code compiler 230 obtains the address of the byte code corresponding to the subsequent basic block to be compiled from the top of the stack. Once the byte code compiler 230 generates an executable basic block 410 corresponding to the subsequent basic block, the pointer 455a is changed to point to the generated executable basic block instead of the byte code compiler 230.

In at least some embodiments, the byte code compiler 230 generates different executable basic blocks for different combinations of type of the variables of a basic block. That is, the byte code compiler 230 generates one executable basic block for variable types integer, another executable basic block where both the variables are float, another executable basic block where one variable is integer and another is float and so on.

Further, in at least some other embodiments, the executable basic blocks may be generated based on criterion other than type of variables in the basic block. The guard code would have instructions accordingly to verify the criteria based on which the executable block is created before the basic block body of the executable block is executed.

Figure 5:
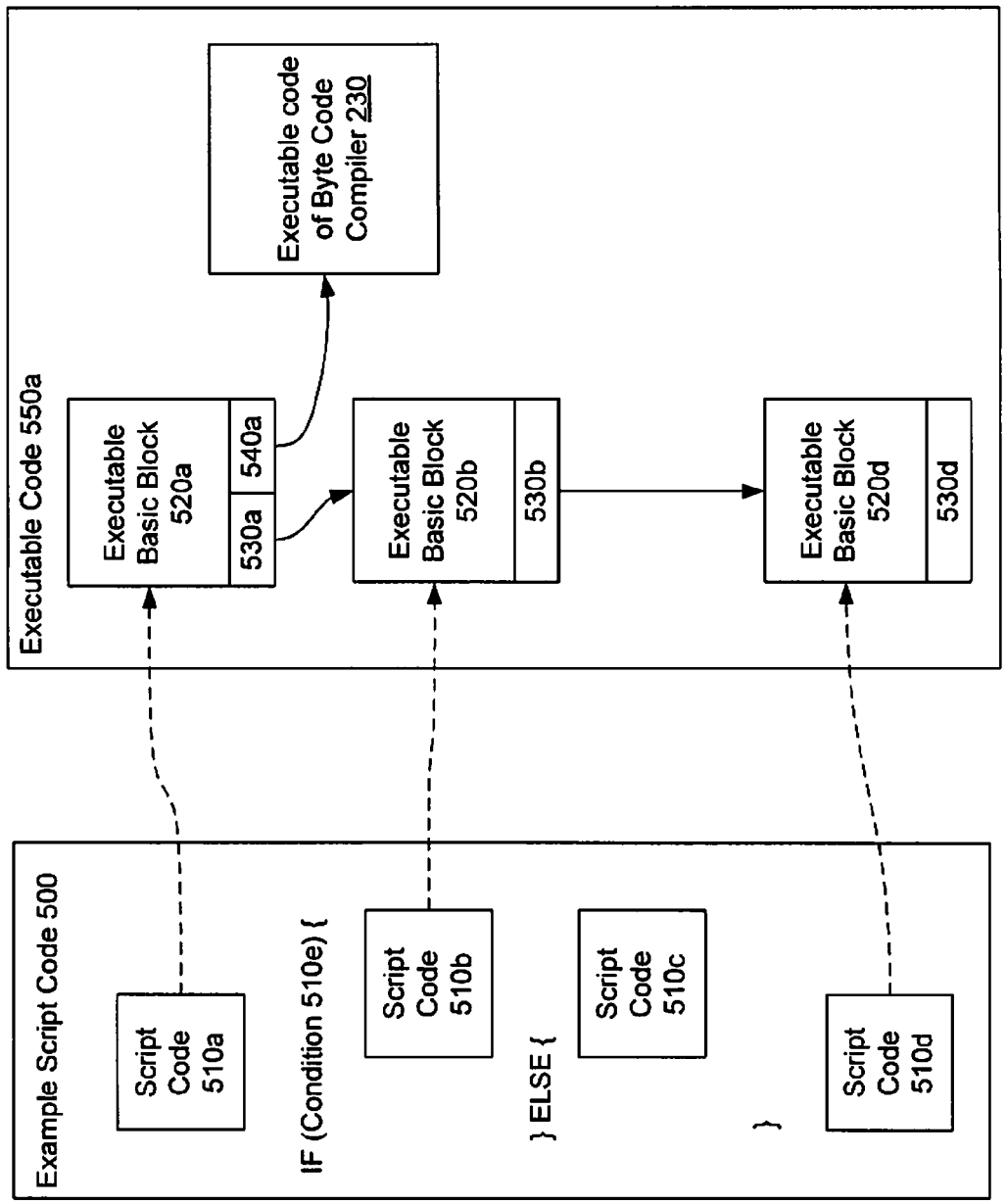
FIG. 5 is a block diagram illustrating incremental compilation of byte code obtained from an example script code.

FIG. 5 illustrates incremental compilation of byte code obtained from an example script code, in accordance with one embodiment of the disclosed technique. FIG. 5 shows an example script code 500 executed in response to a request from client device 160. The example script code 500 includes a portion of byte code 510a followed by an if-then-else statement, followed by another portion of byte code 510d. The if-then-else statement includes a condition 510e, a portion of byte code 510b that is executed if condition 510e evaluates to true, and a portion of byte code 510c that is executed if the condition 510e evaluates to false.

Assume that a request is received from a client 160 that includes values of variables that result in the condition 410e evaluating to true. The resulting executable code generated by the byte code compiler 230 includes the executable code 550a shown in FIG. 5. The portion of script code 510a combined with the condition 510e corresponds to executable code 520a. The executable code 520 includes a guard code 430 in the beginning to verify whether the types of the variables correspond to a specific combination. The end of the executable code 520a includes instructions evaluating the condition 510e. If the condition 410e evaluates to true, the program control is transferred according to exit pointer 530a otherwise the program control is transferred according to exit pointer 540a.

Since the current request received from the client 160 results in the condition 410e evaluating to true, the executable basic block 520b corresponding to portion of script code 510b is also generated. The script code 500 shows that after execution of script code 510b, the script code 510d is executed. Accordingly, the executable basic block 520d corresponding to the script code 510d is also generated. For the execution of the current request, the script code 510c is never executed since it corresponds to the "else" portion of the if-the-else statement that is not executed when the condition 510e evaluates to true. Accordingly, the end of executable basic block 520a includes an exit pointer 540a pointing to the byte code compiler 230 with information identifying byte code corresponding to script code 510c.

If several subsequent requests all include variables with types matching those corresponding to the previous request and result in condition 510e evaluating to true, the executable code 550a can be executed to process these requests. A new set of executable code 550 may be generated if a request is received that requires execution of script code 500 with a new combination of types of variables, different from those corresponding to executable code 550. However, if all requests received from the client device 160 continue providing the same combination of variable types and always result in the condition 510e evaluating to true, the executable code 550 continues to process the requests and no new executable code needs to be generated.

If at any stage, an execution of the script code is performed that provides the previous combination of variable types that cause the condition 510e to evaluate to false, the exit pointer 540a causes the byte code compiler 230 to be invoked causing an executable basic block to be generated corresponding to the script code 510c. The script compiler 110 changes the exit pointer 540a to point to the generated executable basic block instead of the byte code compiler 230. Since the execution of the script code 510c is followed by the execution of the script code 510d, the exit pointer at the end of the executable basic block is configured to point to the executable block 520d corresponding to script code 510d. The executable code 550a which now includes executable block for script code 510c can process requests that result in the condition 510e evaluating to true as well as false without having to invoke the byte code compiler 230. Furthermore, the executable basic block for script code 510c is not generated unless an execution that causes the condition 510e to evaluate to false is received. Accordingly, the script compiler 110 generates executable code in a lazy fashion, the generation performed only if a request requires certain portion of script code to be executed. As a result, the script compiler 110 does not generate dead code, i.e., code that is never executed.

In at least some embodiments, the execution of the script can be further optimized by generating a single executable control region for a set of basic blocks of the script. The executable control region having instructions for executing a set of basic blocks can be generated by combining the executable basic blocks generated for each of the set of basic blocks. The execution engine 240 executes the executable control regions in subsequent requests to execute the executable blocks. The time taken to generate or load one executable control region per multiple basic blocks is lesser compared to the time taken to generate or load one executable block per each of the multiple basic blocks. Accordingly, the efficiency of execution of the script is improved by executing one executable control region instead of executable blocks. However, to combine appropriate executable blocks, the byte code compiler 230 has to have knowledge or context of a set of executable blocks. Since the executable blocks are generated on a need basis, the execution engine 240 may not have the knowledge or context of a group of executable blocks. Accordingly, the execution engine 240 may have to wait until necessary knowledge for further optimization is obtained.

In at least some embodiments, the execution of the script code 500 is optimized using an intermediate representation (IR) of the script code. Typically, a compiler, such as a byte code compiler 230, translates the script code first to some form of IR and then convert the IR into machine code/executable code such as executable blocks of FIGS. 4 and 5.

Figure 6:
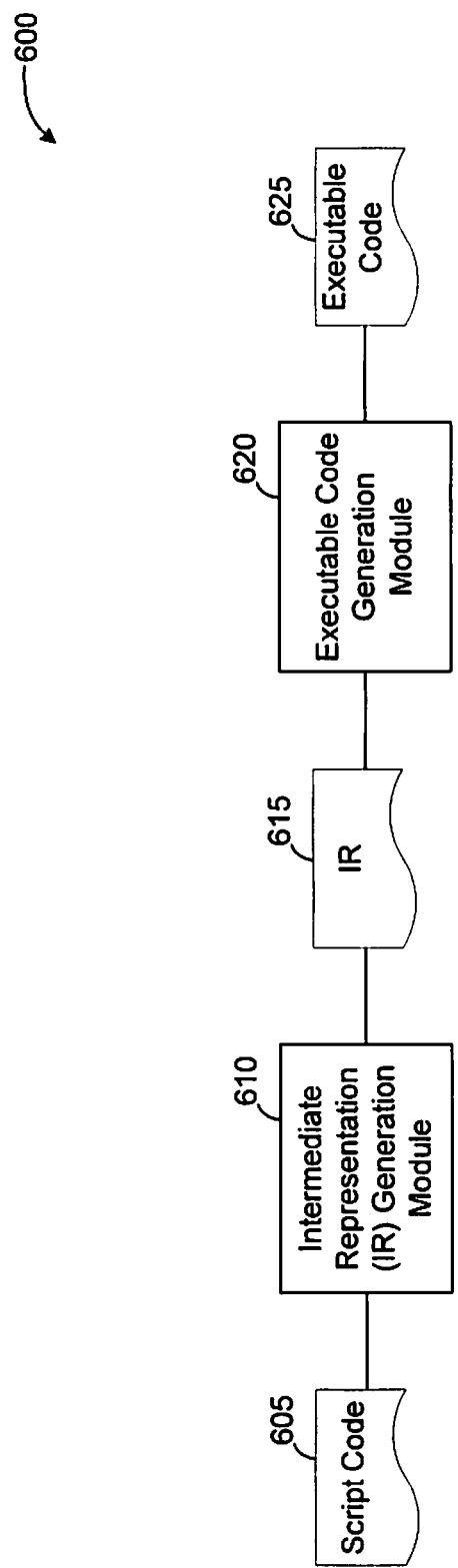
FIG. 6 illustrates a block diagram of a system for generating an intermediate representation (IR) of a script code and converting the IR to executable code for executing the script code.
Figure 7:
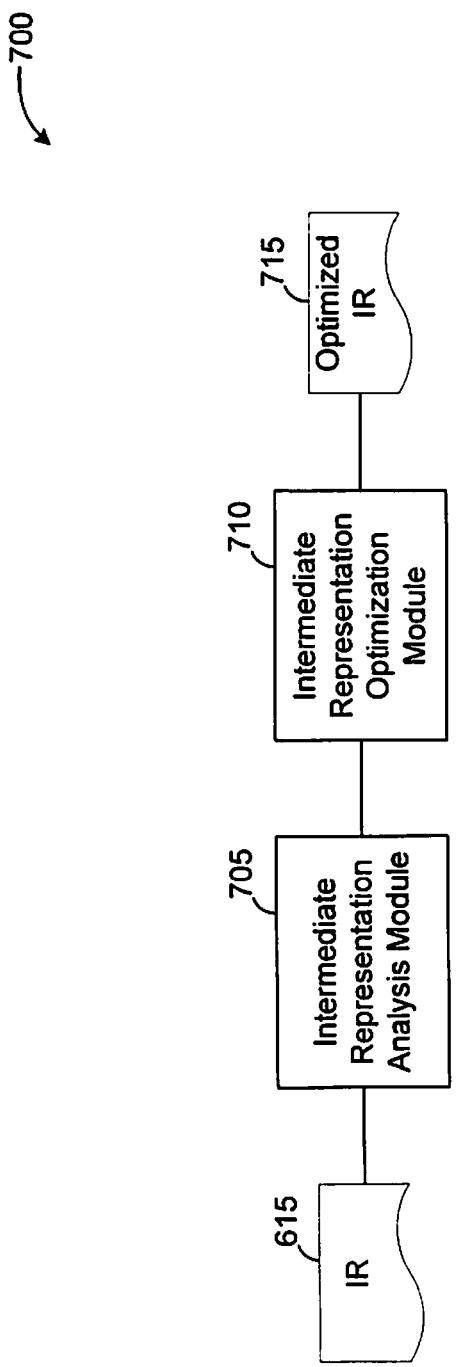
FIG. 7 illustrates a block diagram of a system for optimizing the IR of the script code.
Figure 8A:
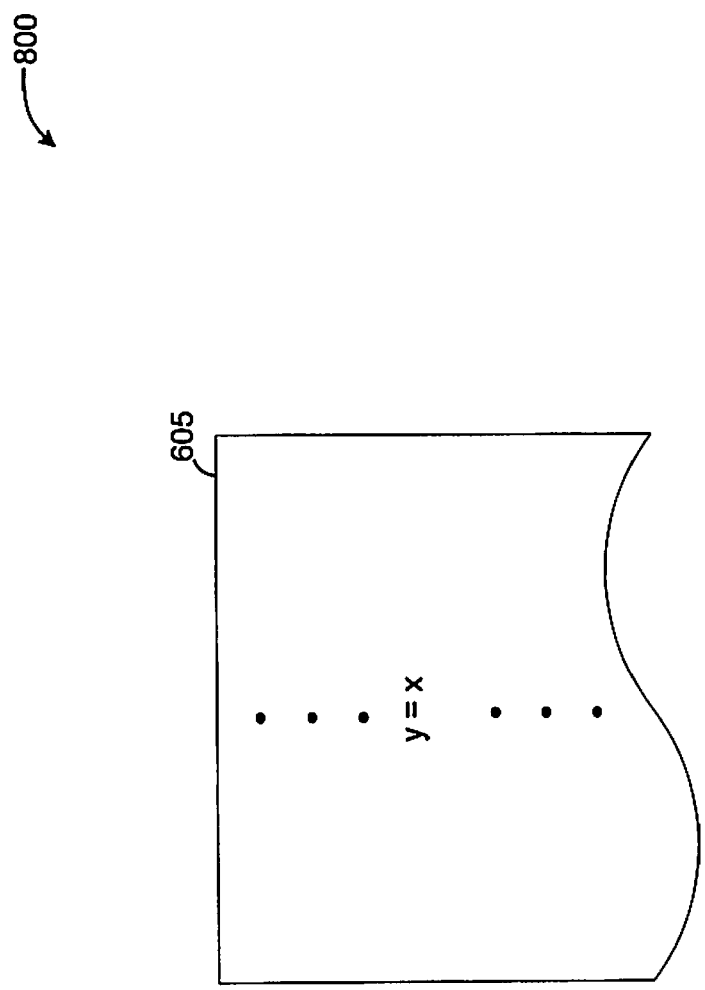
FIG. 8, which includes FIGS. 8(*a*), 8(*b*) and 8(*c*), illustrates an example 800 of optimizing an IR of script code.
Figure 8B:
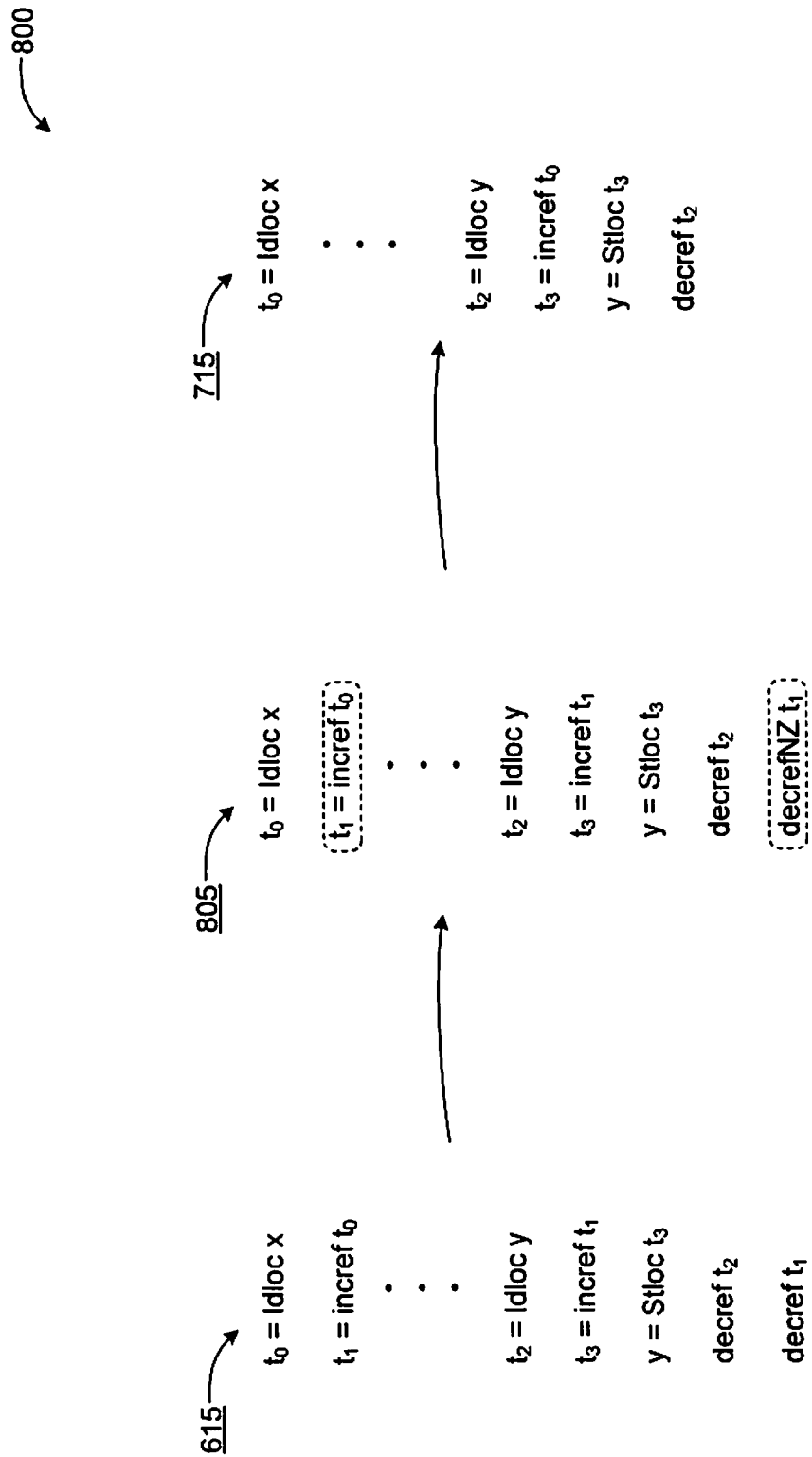
Figure 8C:
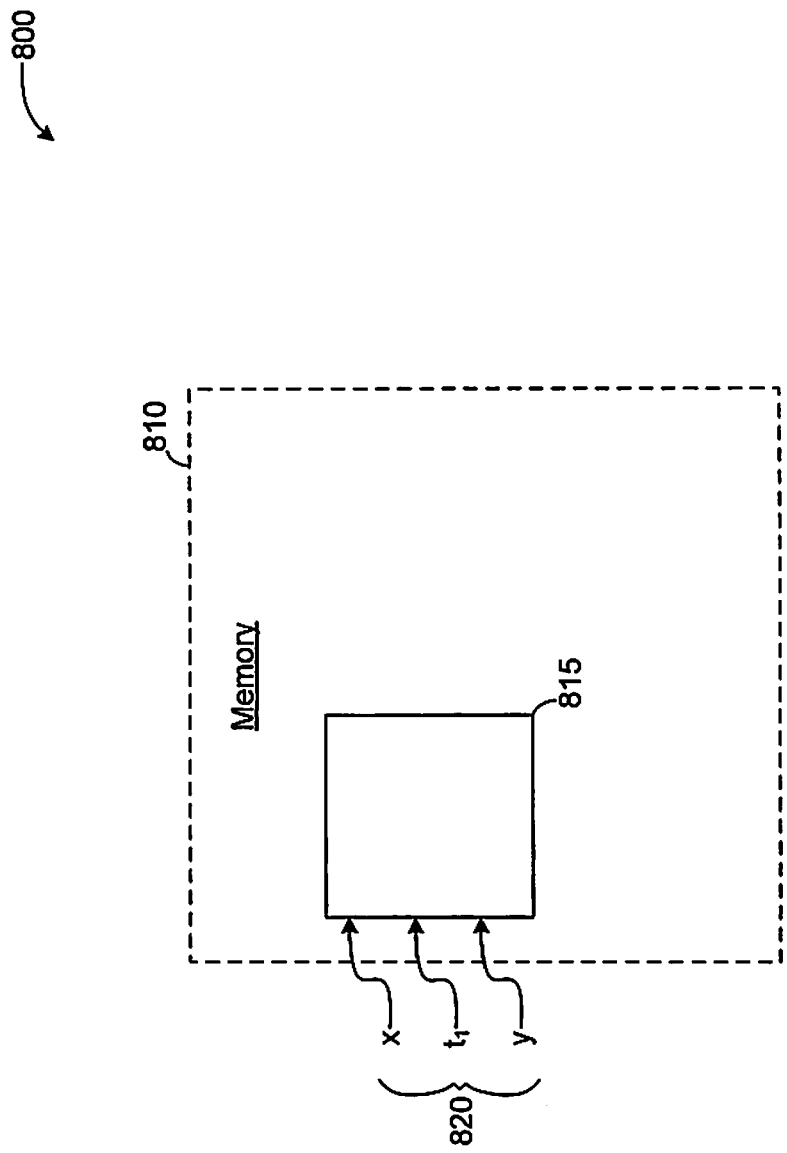

FIGS. 6-8 provide examples of generating an IR of a script code, and optimizing the IR based on an analysis of code for reference count of an object. FIG. 6 illustrates an example environment 600 in which an embodiment of the disclosed technique may operate. The environment 600 includes an IR generation module 610 to generate an IR 615 of script code 605, and an executable code generation module 620 to generate an executable code 625 based on the IR 615. The IR 615 includes code for tracking reference count of an object, that is, number of references, entities, or pointers pointing to an object allocated in the memory. More particularly, the IR 615 includes (a) "incref" code -code for incrementing a reference count of an object when a programming construct such as a variable refers to the object, and (b) an associated "decref"

code—code for decrementing the reference count of the object when a reference to the object is removed.

Further, the decref code can trigger the execution of a user-defined code, such as a destructor, when the reference count of the object goes down to zero. In an embodiment, the destructor is typically executed to perform certain user defined operations when the object is deleted from the memory.

The script code 605 and IR 615 can take various forms. For example, the script code can be similar to script code 500 or byte code as described in FIG. 2, or can include code written in programming languages other than PHP, such as Java, C++, etc. The IR 615 can be generated as a byte code of FIG. 2, or in formats other than the byte code, or in any form between the script code 605 and executable code 625. The executable code 625 is a code generated for a particular type of processor.

In an embodiment, the environment 600 can be part of online system 100, and therefore, the script code 605 can be similar to script code 500 of FIG. 5, the IR 615 can be similar to the byte code described with reference to FIG. 2 or can be generated from the byte code in a form between the byte code and the executable code 625 of FIGS. 4 and 5.

In an embodiment, the IR 615 is further optimized before it is converted into executable code 625. FIG. 7 illustrates a block diagram of a system 700 to generate an optimized IR for a script code by removing redundant reference count operations from the IR, according to an embodiment of the disclosed technique. The system 700 includes an IR analysis module 705 to analyze the IR 615 to identify decref code which does not decrement the reference count of the object to a zero value. An IR optimization module 710 removes the identified decref code and the corresponding incref code (incref-decref code pair) from the IR 615 to generate an optimized IR 715. In an embodiment, the system 700 can be part of online system 100. The analysis and optimization of the IR 615 is described in association with FIG. 8 below.

FIG. 8, which includes FIGS. 8(*a*), 8(*b*) and 8(*c*), illustrates an example script code 605 which is translated into an example IR 615 and then optimized into an example optimized IR 715, according to an embodiment of the disclosed technique. The script code 605 can be executed in a system such as system 700. Consider that a portion of script code 605 includes a line of code for copying a value of one variable to another, such as "y=x." That is, a value of variable x is copied to variable y. Further, consider that the variables are local to a method in the script code 605. However, in other embodiments, the scope of the variables can vary. For example, the variables can be local to an executable block such as the one described in FIGS. 4 and 5 or local to a file containing a portion of the code, etc. The variable x can have an object of any data type, including float, integer, array or a user-defined data type. Typically, when a variable of a particular data type is initialized, the system allocates a portion of the memory to an object "pointed to" or "referred by" the variable. For example, when a variable x is assigned an object 830 of a particular data type, the system allocates a portion of the memory 810 to the object 815 pointed to or referred by x. FIG. 8(*c*) shows the object 815 and the pointer x of pointers 820 pointing to the object 815. When the value of variable x is copied to variable y, y also points to object 815, and the pointers 820 is updated to include pointer y.

During the execution of the script code 605, the object 815 may be copied to various variables, and the number of pointers or references to the object 815 may increase accordingly. The variables pointing to the object 815 may be overwritten with other objects or values, thereby decreasing the number of pointers to the object 815. When the object 815 is not referred to by any variables, that is, when there are no pointers pointing to the object 815, the object 815 may be deleted. The memory allocated to object 815 is reclaimed by the system, which is also referred to as "garbage collection."

As part of garbage collection, the user may also request the system to execute user-defined code, such as a destructor. To ensure that the garbage collection process executes only when there are no pointers pointing to the object 815 (that is, when the reference count of the object 815 is zero), the IR generation module 610 generates in the IR 615 of the script code 605, code for tracking the references to the object 815, such as incref and decref code as shown in FIG. 8(*b*). The IR analysis module 705 and the IR optimization module 710 ensure that only the incref-decref code pair that does not cause the garbage collector to execute is eliminated. In other words, the IR analysis module 705 and the IR optimization module 710 eliminates only the incref-decref code pair that does not cause the reference count of an object to go down to zero.

The following describes the working of incref and decref code in the IR 615 for script code "x=y." The variable x is loaded into a temporary variable $t_0$. Now, since $t_0$ is also pointing to the object 815 pointed to by x, the reference to object 815 is incremented by one. Accordingly, code "incref $t_0$" is generated, as shown in IR 615. In an embodiment, the value of incref $t_0$ can be assigned to another variable $t_1$. Variables $t_0$ and $t_1$ are synonymous. Accordingly, assigning "incref $t_0$" to $t_1$ does not result in two different pointers pointing to the object 815 and therefore, does not require generation of another incref code. The pointer $t_1$ to object 815 is shown in pointers 820 of FIG. 8(*b*). Before variable y is overwritten with x, the current value or the object pointed to by y is stored in another temporary variable $t_2$. The reference count to object 815 is again incremented since y would also point to object 815 when x is loaded into y. Accordingly, an increment operation is performed on the most recent variable pointing to the object 815, $t_1$, and assigned to a new variable $t_3$. Thus, code "$t_3$=incref $t_1$" is generated, as shown in IR 615. Finally, the value of x from $t_3$ is stored into variable y.

The reference count of the object which variable y was pointing to before y was overwritten, that is, $t_2$, is decremented. Accordingly, code "decref $t_2$" is generated. Further, since variable $t_1$ is not used anymore, the reference count to object 815 corresponding to reference $t_1$ is decremented. Accordingly, code "decref $t_1$" is generated. The IR 615 may be then translated to executable code 625 by an executable code generation module 620 and executed in the online system 100.

However, the IR 615 may be further optimized by, for example, removing redundant incref-decref code pair which minimizes the computing resources consumed for the execution of the script code 605. The IR analysis module 705 analyzes the IR 615 to identify redundant incref-decref code pair—an incref-decref code pair that does not cause the reference count of an object to go down to zero. In an embodiment, examples of redundant incref-decref code pair can include incref-decref code pair of a temporary variable used in assigning the value of one variable to another, such as temporary variable $t_1$ used for copying value of variable x to variable y as shown in IR 615. Redundant incref-decref code pair may be identified in other similar scenarios, including scenarios where copies of pointers are created.

One way of identifying the redundant incref-decref code pair is as follows. The IR analysis module 705 analyzes the IR 615 to identify a decref code, and a variable on which the decref code is operating. (For example, "decref $t_1$" and "$t_1$" in the IR 615.) The IR 615 is then analyzed for identifying an incref code which is assigned to the variable on which the decref code is operating. (For example, "incref $t_o$" which is assigned to $t_i$ in IR 615.) The IR 615 is further analyzed to determine if the object (or value of the object) to which the variable is pointing to has changed in the portion of IR 615 between the identified incref code and the decref code. If the object has not changed, then the IR analysis module 705 marks the incref-decref code pair as redundant code, as shown in IR 805. (For example, the "decref $t_i$" and "$t_i$=incref $t_0$" in IR 615 is marked since the object 815 referred to by variable $t_1$ (or $t_0$, or x which are synonymous to $t_1$) on which the identified incref-decref code pair is operating has not changed between the code "$t_i$=incref $t_0$" and "decref $t_1$.")

However, if the IR analysis module 705 does not find the corresponding incref code or if the object associated with the incref-decref code pair has changed, then the incref-decref code pair may not be eliminated. (For example, "decref $t_2$" associated with variable y in IR 615 does not have an associated incref, or even if it has an associated incref elsewhere in the IR 615, the incref-decref code pair associated with variable y is not marked for elimination because value of variable y has changed between the incref-decref code pair at line "y=stloc $t_3$.")

In at least some embodiments, the "incref $t_o$" code is not assigned to variable $t_1$. For example, the "incref $t_0$" code can exist without the assignment to any variable. In such embodiments, the IR analysis module 705 analyzes the IR 615 to determine if the object to which the variable $t_0$ (or x which is the value loaded into $t_0$) is pointing to has changed in the portion of IR 615 between the identified incref code and the decref code.

The above described optimization of the IR 615 may be performed in one or more passes. In an embodiment, the optimization of the IR 615 is performed in two passes. For example, in a first pass the IR analysis module 705 analyzes the IR 615 to identify the decref code which does not result in decrementing a reference count of an object to a zero value. The analysis includes identifying the decref code and the object (for example, a variable) on which the decref code is operated, identifying the corresponding incref code, and determining if the value of the variable has changed between the identified incref code-decref code pair. If the value of the variable has not changed, then the decref code is replaced with (or renamed to) decrefNZ indicating that the decrefNZ code would not decrement the reference count of the object pointed to by the variable to zero value. In a second pass, the IR optimization module 710 identifies the decrefNZ code and the corresponding incref code. The IR optimization module 710 removes the incref-decrefNZ code pair from the IR 615 to generate the optimized IR 715.

In an embodiment, the two pass optimization may provide an additional advantage of partial code elimination. For example, if the IR 615 includes a branch or jump command between the incref-decrefNZ code pair, the execution may be transferred to a different portion of the script code 605. Consider that the execution of the script code is branched from a main portion of IR 615 (for example, the portion having the identified incref-decrefNZ code pair) to a secondary portion of the script code (not shown) indicated by the jump command. The value of the variable $t_1$ may or may not change in the secondary portion of the code. If the value of $t_1$ has changed, the secondary portion of the code may have a decref $t_1$ code too. So, the change in value of $t_1$ may not be captured in the first pass since the first pass may not inspect a portion that is not part of the main portion under analysis. The IR analysis module 705 analyzes the secondary portion of the IR 615 in the second pass. Accordingly, the IR analysis module 705/IR optimization module 710 identifies the change in the value of $t_i$ in the second pass.

The type of operation performed on $t_1$ in the secondary portion may include a decref code. Further, the decref code in the secondary portion may or may not decrement the reference count of the object on which it is operating to zero. Accordingly, in order to optimize the code, the IR optimization module 710 copies the code "$t_i$=incref $t_0$" from the IR 615 to the secondary portion of the code, and inserts it before the decref $t_1$ code in the secondary portion. After copying the code "$t_i$=incref $t_0$" to the secondary portion, the IR optimization module 710 optimizes the main portion of the IR 615 by removing the incref-decrefNZ code pair. Thus, the code in IR 615 is partially eliminated. That is, partial elimination of code includes, for example, copying a part of the code from a first portion to a second portion, and eliminating code from the first or second portions.

In an embodiment, if the decref $t_1$ in the secondary portion is further analyzed to be a decrefNZ, then the IR optimization module 710 eliminates the incref-decrefNZ code pair from the secondary portion of the code as well.

Figure 9:
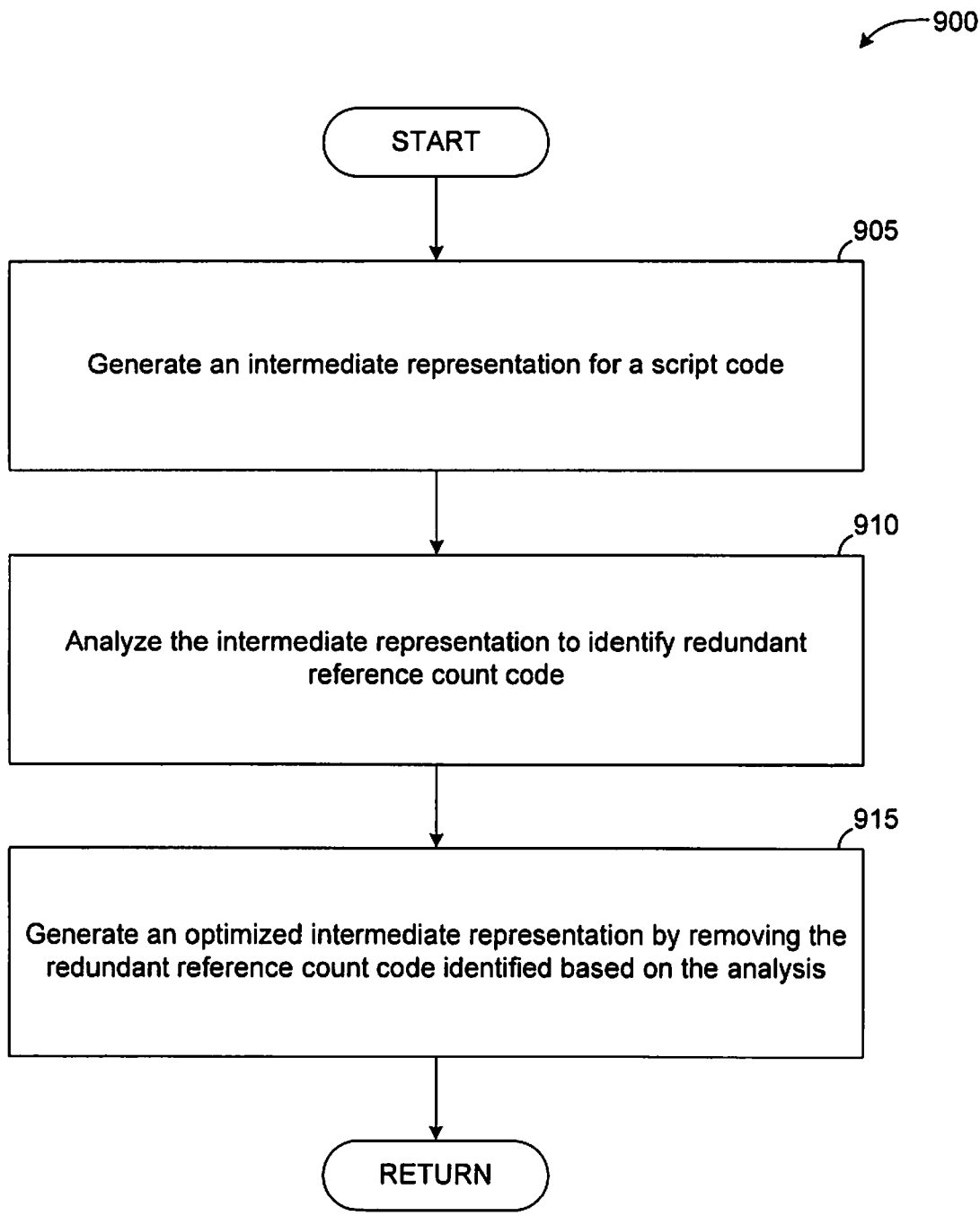
FIG. 9 is a flow diagram of a process of optimizing the IR of the script code by eliminating redundant incref-decref code pair from the IR.

FIG. 9 is a flow diagram illustrating a process of optimizing an IR of script code, according to an embodiment of the disclosed technique. The process 900 may be executed in a system such as online system 100 and/or system 700. At step 905, the IR generation module 610 generates an IR for a script code, for example, IR 615 for script code 605. In an embodiment, the IR 615 includes incref code and decref code for tracking a reference count of an object, that is, a number of pointers pointing to an object in the memory. At step 910, the IR analysis module 705 analyzes the IR 615 to identify redundant incref-decref code pair. In an embodiment, a redundant incref-decref code pair includes a code pair that does not reduce the reference count of an object pointed to by the variable on which the code pair operates to zero. At step 915, the IR optimization module 710 generates an optimized IR 715 by eliminating the redundant incref-decref code pair from the IR 615.

Figure 10:
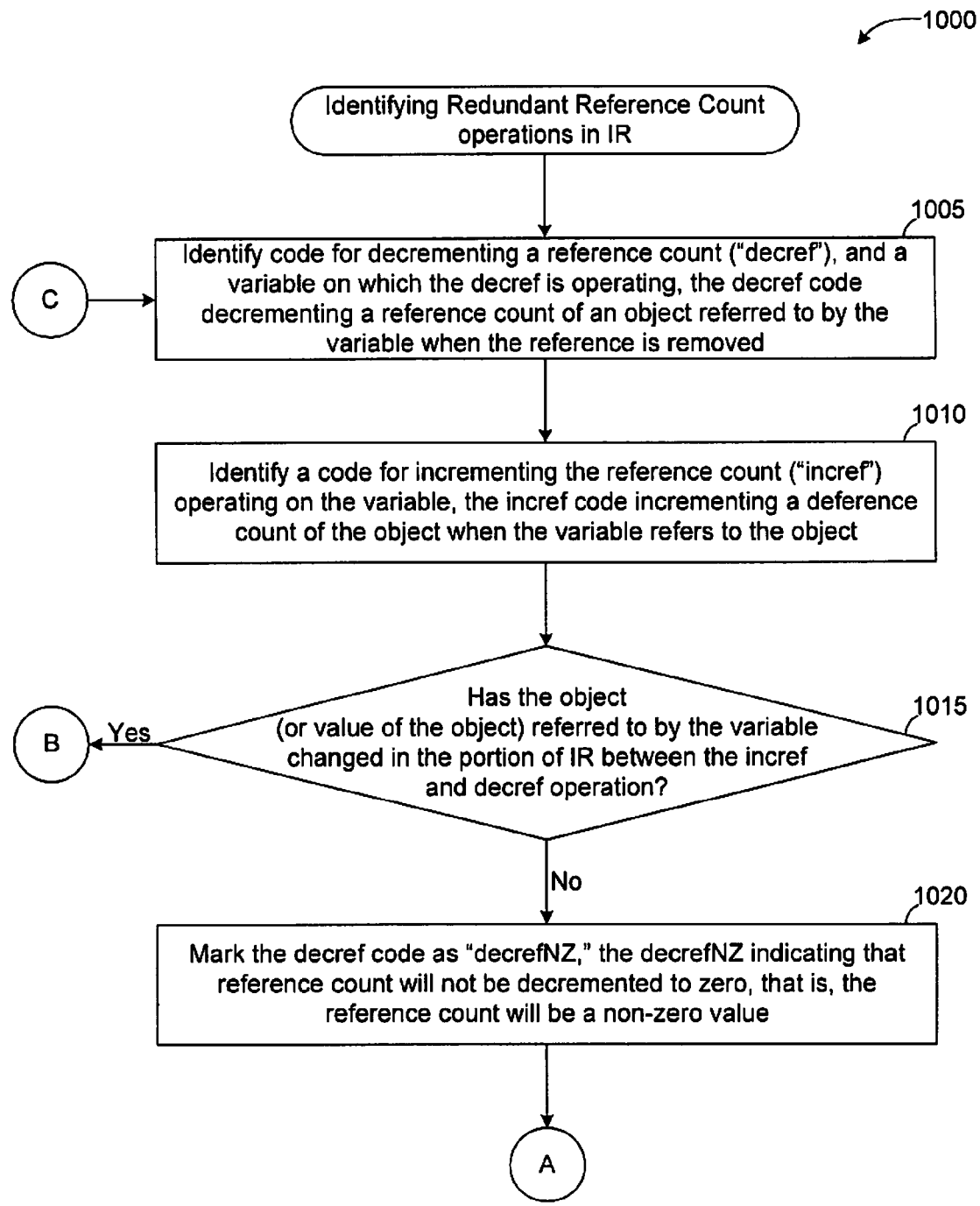
FIG. 10 is a flow diagram illustrating a process of analyzing the IR of the script code to identify redundant incref-decref code pair.
Figure 10:
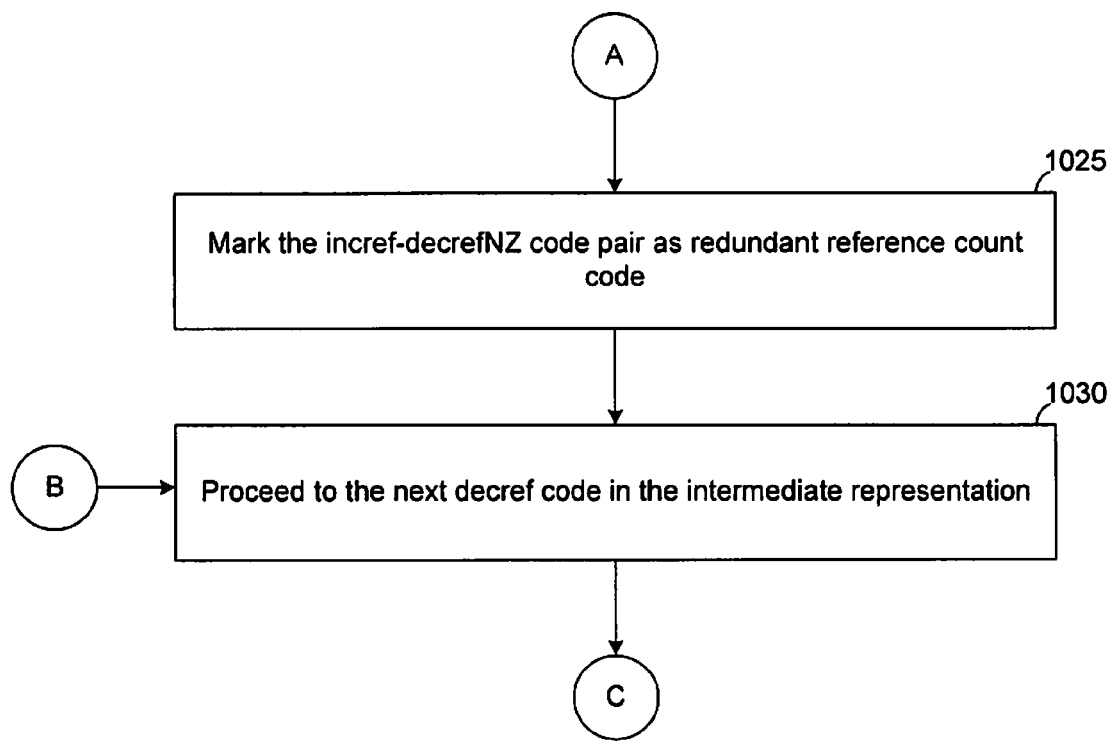

FIG. 10 is a flow diagram of a process 1000 to identify the redundant incref-decref code pair in the IR of the script code, according to an embodiment of the disclosed technique. The process 1000 may be executed in a system such as online system 100 and/or system 700. At step 1005, the IR analysis module 705 identifies the decref code and a variable on which the decref is operating. At step 1010, the IR analysis module 705 identifies the incref code assigned to the variable on which the decref code is operating. Further, in an embodiment, if the IR analysis module 705 does not find a corresponding incref code for the identified decref code, the identified decref code is determined not to be redundant.

At determination step 1015, the IR analysis module 705 determines whether the object referred to by the variable has changed (in other words, if the value of the variable has changed) between the identified decref-incref code pair. Responsive to a determination that that the value of the object has changed, the IR analysis module 705 determines that the incref-decref code pair is not redundant, and the IR analysis module 705 proceeds to step 1030 for analyzing the next identified decref code. On the other hand, responsive to a determination the value of the variable has not changed, at step 1020, the IR analysis module 705 marks the decref code as decrefNZ indicating that that the identified decref code does not decrement the reference count of the object referred to by the variable to zero. At step 1025, the IR analysis module 705 marks the identified incref-decrefNZ code as redundant incref-decrefNZ code pair. At step 1030, the IR analysis module 705 continues the analysis with the next decref code in the IR 615.

In an embodiment, the script code 605 can be programmed to be executed in either a single threaded environment or a multi-threaded environment.

In the multithreaded environment, the IR analysis module 705 ensures that the analysis, such as determination of whether the variable on which the incref-decref code pair operates is changed by any operation, is performed considering all the threads executing the script code 605.

Figure 11:
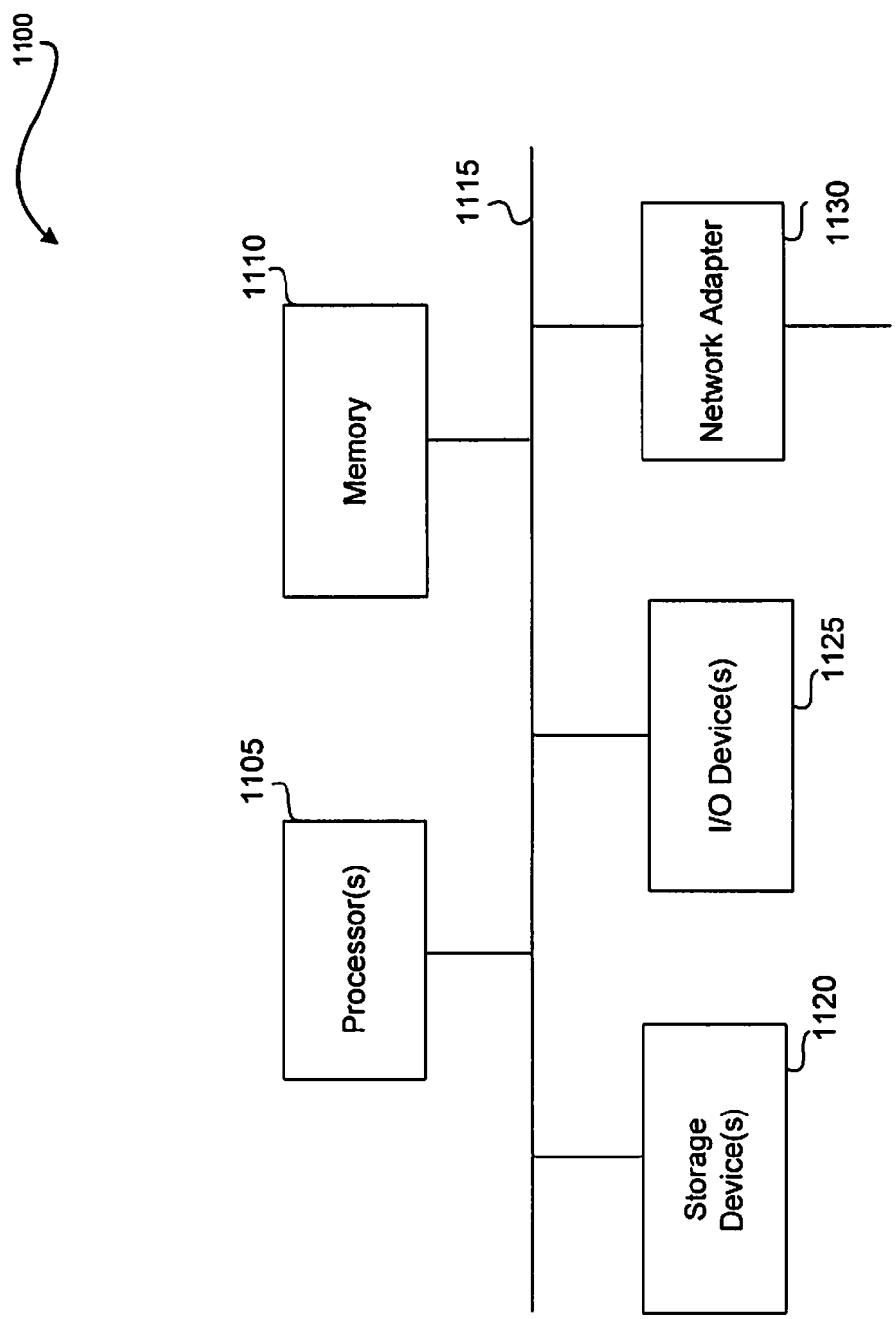
FIG. 11 is a block diagram of a processing system that can implement operations of the present invention.

FIG. 11 is a block diagram of an apparatus that may perform various operations, and store various information generated and/or used by such operations, according to an embodiment of the disclosed technique. The apparatus can represent any computer or processing system described herein. The processing system 1100 is a hardware device on which any of the entities, components or services depicted in the examples of FIGS. 1-10 (and any other components described in this specification), such as client device 160, online system 100, IR generation module 610, IR analysis module 705, IR optimization module 710, etc. can be implemented. The processing system 1100 includes one or more processors 1105 and memory 1110 coupled to an interconnect 1115. The interconnect 1115 is shown in FIG. 11 as an abstraction that represents any one or more separate physical buses, point to point connections, or both connected by appropriate bridges, adapters, or controllers. The interconnect 1115, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 1105 is/are the central processing unit (CPU) of the processing system 1100 and, thus, control the overall operation of the processing system 1100. In certain embodiments, the processor(s) 1105 accomplish this by executing software or firmware stored in memory 1110. The processor(s) 1105 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 1110 is or includes the main memory of the processing system 1100. The memory 1110 represents any form of random access memory (RAM), read-only memory (ROM), flash memory, or the like, or a combination of such devices. In use, the memory 1110 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 1105 through the interconnect 1115 are a network adapter 1130, a storage device(s) 1120 and I/O device(s) 1125. The network adapter 1130 provides the processing system 1100 with the ability to communicate with remote devices, over a network and may be, for example, an Ethernet adapter or Fibre Channel adapter. The network adapter 1130 may also provide the processing system 1100 with the ability to communicate with other computers within the cluster. In some embodiments, the processing system 1100 may use more than one network adapter to deal with the communications within and outside of the cluster separately.

The I/O device(s) 1125 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 1110 can be implemented as software and/or firmware to program the processor(s) 1105 to carry out actions described above. In certain embodiments, such software or firmware may be initially provided to the processing system 1100 by downloading it from a remote system through the processing system 1100 (e.g., via network adapter 1130).

The techniques introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device (s) 1120 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

What is claimed is:
1. A method comprising:
generating, at a computer in a computer system, an intermediate representation of a script code, the intermediate representation being a form of the script code configured to be converted to an executable code for execution, the generating the intermediate representation including:
generating, for an object allocated in a memory of the computer, a set of first code, at least some of the set of first code incrementing a reference count of the object when a programming construct refers to the object, the reference count indicating a number of references to the object, and generating a set of second code, at least some of the set of second code decrementing the reference count of the object when a reference of the programming construct referring to the object is removed;

identifying, by the computer and in the intermediate representation, a second code of the set of second code which, upon execution, does not decrement the reference count of the object to a zero value;

replacing the second code with a third code, the third code decrementing the reference count of the object when a reference of the programming construct referring to the object is removed, the third code indicative of a non-zero value yielding function;

identifying, by the computer and in the intermediate representation, a first code of the set of first code corresponding to the third code; and removing, by the computer and from the intermediate representation, the first code and the third code.

2. The method of claim 1 further comprising:
converting, at the computer, the intermediate representation to the executable code in response to a request to execute the script code.

3. The method of claim 2 further comprising:
executing, at the computer, the script code using the generated executable code.

4. The method of claim 1, wherein the first code that increments the reference count of the object operates on a first variable, the first variable containing a value of the object.

5. The method of claim 1, wherein the second code decrementing the reference count of the object operates on the first variable.

6. The method of claim 1, wherein identifying the first code corresponding to the third code includes:
determining, for the third code operating on a variable, whether a first code that is assigned to the variable exists,
responsive to a determination that the first code assigned to the variable exists, determining whether the variable is modified by a fourth code, the fourth code being different from the third code, and
responsive to a determination that the variable is not modified by the fourth code, identifying the first code as corresponding to the third code.

7. The method of claim 6 further comprising:
responsive to a determination that the variable is modified by the fourth code, splitting the intermediate representation into a first portion and a second portion, the first portion excluding the fourth code, and the second portion including the fourth code modifying the variable; and
identifying the first code in the first portion of the intermediate representation as corresponding to the third code of the set of third code.

8. The method of claim 7 further comprising:
determining whether the fourth code is one of the set of second code that decrements the reference count of the object to zero; and
responsive to a determination that the fourth code is the one of the set of second code that decrements the reference count of the object to zero, copying the first code in the first portion of the intermediate code to the second portion of the intermediate code.

9. The method of claim 8, wherein the first portion of the intermediate representation is a portion of the intermediate representation whose frequency of execution exceeds a predefined value.

10. The method of claim 1, wherein identifying the second code includes identifying the second code in a first iteration of multiple iterations of generation of the intermediate representation.

11. The method of claim 10, wherein replacing the second code with the third code includes replacing the second code with the third code in a second iteration of iterations.

12. The method of claim 11, wherein the removing the first code and the third code includes removing the first code and the third code in a third iteration of iterations.

13. The method of claim 1, wherein the at least some of the set of second code further includes a user-defined code that is configured to execute when the reference count is decremented to zero.

14. The method of claim 1, wherein the script code executes in a multi-threaded environment.

15. A method comprising:
generating, at a computer in a computer system, an intermediate representation of a script code by processing the script code in multiple iterations, the processing including:
in a first iteration of the iterations,
identifying in the intermediate representation (a) a set of first code, wherein at least some of the set of first code, upon execution, increments a reference count of an object when a programming construct refers to the object, and (b) a set of second code, wherein at least some of the set of second code, upon execution, decrements the reference count of the object when a reference of the programming construct referring to the object is removed,
in a second iteration of the iterations,
identifying a second code of the set of second code which, upon execution, does not decrement the reference count of the object to a zero value,
identifying, from the intermediate representation, the second code and a first code corresponding to the second code as a redundant code pair, and
in a third iteration of the iterations,
deleting, from the intermediate representation, the redundant code pair.

16. The method of claim 15 further comprising:
converting, at the computer, the intermediate representation to an executable code in response to a request to execute the script code.

17. The method of claim 15, wherein identifying the second code includes replacing the second code with a third code, the third code indicative of a non-zero value yielding function.

18. The method of claim 17, wherein identifying the redundant code-pair includes identifying the third code and the first code as the redundant code-pair.

19. A system comprising:
a processor;
an intermediate representation generation module working in cooperation with the processor to generate an intermediate representation of a script code, the intermediate representation generation module configured to generate the intermediate representation by:
generating, for an object allocated in a memory of a computer, a set of first code, at least some of the set of first code incrementing a reference count of the object when a programming construct refers to the object, the reference count indicating a number of references to the object, and
generating a set of second code, at least some of the set of second code decrementing the reference count of the object when a reference of the programming construct referring to the object is removed;
an intermediate representation analysis module working in cooperation with the processor to:
   identify a second code of the set of second code which, upon execution, does not decrement the reference count of the object to a zero value,
   replace the second code with a third code, the third code decrementing the reference count of the object when a reference of the programming construct referring to the object is removed, the third code indicative of a non-zero value yielding function, and
   identify a first code of the set of first code corresponding to the third code; and
an intermediate representation optimization module that works in cooperation with the processor to remove, from the intermediate representation, the first code and the third code.

20. The system of claim 19 further comprising:
an executable code generation module that works in cooperation with the processor to convert the intermediate representation to an executable code in response to a request to execute the script code.

\* \* \* \* \*